US011008068B2

(12) United States Patent
Kimura

(10) Patent No.: US 11,008,068 B2
(45) Date of Patent: May 18, 2021

(54) BICYCLE GEAR SHIFT OPERATING APPARATUS AND GEAR SHIFT POSITION NOTIFICATION APPARATUS

(71) Applicant: GROWTAC, INC., Kawasaki (JP)

(72) Inventor: Masayuki Kimura, Kawasaki (JP)

(73) Assignee: GROWTAC, INC., Kaganawa (JP)

( * ) Notice: Subject to any disclaimer, the term of this patent is extended or adjusted under 35 U.S.C. 154(b) by 0 days.

(21) Appl. No.: 16/616,420

(22) PCT Filed: Jun. 13, 2018

(86) PCT No.: PCT/JP2018/022530
§ 371 (c)(1),
(2) Date: Nov. 22, 2019

(87) PCT Pub. No.: WO2019/009030
PCT Pub. Date: Jan. 10, 2019

(65) Prior Publication Data
US 2020/0140036 A1   May 7, 2020

(30) Foreign Application Priority Data

Jul. 5, 2017   (JP) .............................. JP2017-131886

(51) Int. Cl.
*B62M 25/02*   (2006.01)
*B62K 23/02*   (2006.01)
(Continued)

(52) U.S. Cl.
CPC ............. *B62M 25/04* (2013.01); *B62K 23/06* (2013.01); *B62M 2025/003* (2013.01)

(58) Field of Classification Search
CPC ... B62M 25/04; B62M 2025/003; B62K 3/00; B62K 23/02; B62K 23/06; F16H 59/0278
See application file for complete search history.

(56) References Cited

U.S. PATENT DOCUMENTS 3,362,238 A * 1/1968 Hayashi ................. B62K 23/06
474/82
3,418,867 A * 12/1968 Maeda ................... B62K 23/06
74/535
(Continued)

FOREIGN PATENT DOCUMENTS

FR    1190389 A  * 10/1959  ............ B62M 25/04
JP    02267094 A    10/1990
(Continued)

OTHER PUBLICATIONS

Japan Patent Office, International Search Report, dated Aug. 28, 2018, Tokyo, Japan.
(Continued)

*Primary Examiner* — Adam D Rogers
(74) *Attorney, Agent, or Firm* — Steven M. Shape; Dennemeyer & Associates, LLC

(57) ABSTRACT

A bicycle gear shift operating apparatus is provided which can easily stop a gear shift operating lever at a gear shift position without replacing all constituent parts of a component. A gear shift operating apparatus 100 is an apparatus that is coupled to a rear derailleur 70 of a bicycle via a shift cable 60. The gear shift operating apparatus 100 includes a gear shift operating lever unit 40, an operating shaft 1 that rotates by operation of the gear shift operating lever unit 40 and pulls and releases the shift cable 60, and a replaceable gear shift position notification unit 10. Rotation stop positions corresponding respectively to gear shift positions of the rear derailleur 70 that are switched in accordance with the rotation of the operating shaft 1 are set in the gear shift position notification unit 10.

9 Claims, 11 Drawing Sheets

(51) Int. Cl.
  *B62M 25/04* (2006.01)
  *B62K 23/06* (2006.01)
  *B62M 25/00* (2006.01)

(56) References Cited

U.S. PATENT DOCUMENTS

| | | | | |
|---|---|---|---|---|
| 3,442,148 | A | * | 5/1969 | Juy ........................ B62M 25/04 |
| | | | | 74/470 |
| 4,751,852 | A | * | 6/1988 | Nagano .................. B62M 25/04 |
| | | | | 74/473.1 |
| 4,885,951 | A | * | 12/1989 | Desenclos .............. B62M 25/04 |
| | | | | 74/502.2 |
| 4,966,046 | A | * | 10/1990 | Tagawa .................. B62M 25/04 |
| | | | | 74/473.13 |
| 6,244,207 | B1 | * | 6/2001 | Chen ...................... B62K 23/04 |
| | | | | 116/28.1 |
| 8,485,060 | B2 | * | 7/2013 | Emura ................... B62M 25/04 |
| | | | | 74/473.14 |

FOREIGN PATENT DOCUMENTS

| | | | | |
|---|---|---|---|---|
| JP | H08169387 | A | | 7/1996 |
| JP | H1035566 | A | | 2/1998 |
| JP | 2003-261090 | A | | 9/2003 |
| JP | 2007-76510 | A | | 3/2007 |
| JP | 2009008258 | A | * 1/2009 | ............ B62M 11/16 |
| WO | 96/30250 | A1 | | 10/1996 |

OTHER PUBLICATIONS

Office Action issued in connection with Application No. JP 2017-131886 dated Sep. 26, 2017.
Office Action issued in connection with Application No. JP 2017-131886 dated Jan. 31, 2018.
Office Action issued in connection with Application No. JP 2017-131886 dated Mar. 29, 2018.
Office Action issued in connection with Application No. JP 2017-131886 dated May 24, 2018.

* cited by examiner

BICYCLE GEAR SHIFT OPERATING APPARATUS AND GEAR SHIFT POSITION NOTIFICATION APPARATUS

TECHNICAL FIELD

The present invention relates to an apparatus that performs a gear shift operation of a transmission of a bicycle and an apparatus used for this. The present invention particularly relates to a bicycle gear shift operating apparatus that can easily stop a gear shift operating lever at a gear shift position without replacing all constituent parts of a component, and a gear shift position notification apparatus.

Background Art

A component of a bicycle includes, for example, a group of (1) a gear shift operating lever and a brake lever, (2) a rear derailleur (transmission), and (3) a crank, and further includes a group of (4) a front derailleur (transmission) in addition to the above.

In such a component, for example, the rear derailleur and the gear shift operating lever configure a gear shifting apparatus. As the rear derailleur, an index type including a mechanism that can determine a gear shift position is known (Patent Literature 1).

An index type that notifies the operation position of the gear shift operating lever with, for example, a click in accordance with the gear shift position is used as an indexed gear shift operating apparatus provided for the rear derailleur.

A type that does not include the mechanism that determines the gear shift position is known as another configuration of the rear derailleur. In terms of the gear shift operation of this type of rear derailleur, the gear shift position is determined through the senses while the gear shift operating lever that can rotate within a predetermined rotation range is operated. A friction type is known which, when the control force is released from the gear shift operating lever, uses a frictional force to stop the gear shift operating lever at the position.

In an indexed or friction gear shifting apparatus, a derailleur is provided with a tension spring for applying predetermined tension to a chain. In the gear shift operation, for example, if the gear shift operating lever shifts to a lower gear, a guide pulley moves against the spring force of the tension spring from a higher gear to the lower gear of the transmission gears via a shift cable including a wire cable.

The shift amount of the gear shift operating lever corresponds to, for example, a movement width where the guide pulley moves between gears of the transmission gears. However, the movement width varies according to the product.

CITATION LIST

Patent Literature

Patent Literature 1: JP-A-2009-008258

SUMMARY OF THE INVENTION

Problems to be Solved by the Invention

In terms of a component of a bicycle, each part forming one group, especially the gear shifting apparatus, is generally not compatible. Hence, both of the derailleur and the gear shift operating apparatus need to be simultaneously replaced with the same products upon replacement.

Furthermore, the following problems with the gear shift operating apparatus are pointed out:

1. When the gear shift operating lever is operated, the gear shift operating lever need to be operated against the spring force of the tension spring of the derailleur, depending on the operation direction. Hence, the operation becomes heavy.

2. The spring force of the tension spring of the derailleur is added to the gear shift operating lever. Hence, the gear shift operating lever tends to be displaced. As a result, it becomes impossible to fix the shift cable at the gear shift position. Hence, it is also conceivable that the chain comes off the transmission gear.

Hence, the present invention has been made focusing on such unsolved problems of known technologies. In other words, an object of the present invention is to provide a bicycle gear shift operating apparatus that can easily stop a gear shift operating lever at a gear shift position without replacing all constituent parts of a component, and a gear shift position notification apparatus.

Another object of the present invention is to provide a gear shift position notification apparatus that can easily notify a gear shift position in accordance with a derailleur, and can be replaced for a bicycle gear shift operating apparatus.

Still another object of the present invention is to provide a bicycle gear shift operating apparatus that ensures light operation of a gear shift operating lever.

Solutions to the Problems

[First Aspect] A bicycle gear shift operating apparatus of a first aspect for achieving the above objects is a bicycle gear shift operating apparatus coupled to a transmission of a bicycle via a shift cable. The bicycle gear shift operating apparatus includes: a gear shift operating lever unit configured to pull and release the shift cable; and a replaceable gear shift position notification unit. Stop positions corresponding respectively to gear shift positions of the transmission, the gear shift positions being switched in accordance with operation of the gear shift operating lever unit, are set in the gear shift position notification unit.

Here, "notification" includes notification by sensible methods through display, vibration, sound output, and heat generation, and other five senses. The same shall apply to the concept of notification below.

[Second Aspect] Furthermore, in the bicycle gear shift operating apparatus of a second aspect, the gear shift position notification unit of the bicycle gear shift operating apparatus of the first aspect has a first member and a second member that rotate relatively in accordance with the operation of the gear shift operating lever unit. The first member has notification position portions at rotation angle positions corresponding to the gear shift positions of the transmission. The second member has a notification operating portion that notifies the stop position in cooperation with the notification position portion. One or both of the first and second members are replaceable.

[Third Aspect] Furthermore, the bicycle gear shift operating apparatus of a third aspect includes a pressure unit. The pressure unit applies a biasing force in a direction that cancels out a reverse input added from the transmission side of the bicycle gear shift operating apparatus of the first or second aspect via the shift cable.

[Fourth Aspect] Furthermore, the bicycle gear shift operating apparatus of a fourth aspect includes a reverse input shutoff unit. The reverse input shutoff unit transmits power inputted from the gear shift operating lever unit of the bicycle gear shift operating apparatus of any one of the first to third aspects and shuts off transmission of power reversely inputted into the gear shift operating lever unit.

[Fifth Aspect] Furthermore, in the bicycle gear shift operating apparatus of a fifth aspect, the reverse input shutoff unit of the bicycle gear shift operating apparatus of the fourth aspect is placed between the gear shift operating lever unit and the pressure unit.

[Sixth Aspect] Furthermore, a bicycle gear shift operating apparatus of a sixth aspect is a bicycle gear shift operating apparatus coupled to a transmission of a bicycle via a shift cable. The bicycle gear shift operating apparatus includes: a gear shift operating lever unit configured to pull and release the shift cable; and a pressure unit. The pressure unit applies a biasing force in a direction that cancels out a reverse input added from the transmission side via the shift cable.

[Seventh Aspect] Furthermore, a bicycle gear shift operating apparatus of a seventh aspect is a bicycle gear shift operating apparatus coupled to a transmission of a bicycle via a shift cable. The bicycle gear shift operating apparatus includes: a gear shift operating lever unit configured to pull and release the shift cable; and a reverse input shutoff unit. The reverse input shutoff unit transmits power inputted from the gear shift operating lever unit and shuts off transmission of power reversely inputted into the gear shift operating lever unit.

[Eighth Aspect] On the other hand, a gear shift position notification apparatus of an eighth aspect for achieving the above objects is a gear shift position notification apparatus applied to a bicycle gear shift operating apparatus. The gear shift position notification apparatus is coupled to a transmission of a bicycle via a shift cable. Moreover, this bicycle gear shift operating apparatus includes: a gear shift operating lever unit configured to pull and release the shift cable. Stop positions corresponding respectively to gear shift positions of the transmission, the gear shift positions being switched in accordance with operation of the gear shift operating lever unit, are set. This bicycle gear shift operating apparatus is replaceable with the above bicycle gear shift operating apparatus.

Effects of the Invention

As described above, according to the bicycle gear shift operating apparatus of the first aspect, even if the specifications of the transmissions before and after replacement are different, the replacement is made with a gear shift position notification unit provided for the transmission after replacement to allow the transmission after replacement to find the gear shift position. Hence, the gear shift operating lever unit can be relatively easily stopped at the gear shift position. Hence, there is no need to replace, as before, all constituent parts of a component. The replacement of the transmission is sufficient.

Furthermore, according to the bicycle gear shift operating apparatus of the second aspect, the gear shift position notification unit can be simply configured. Moreover, a reduction in the number of parts replaced can also be achieved. Hence, a replacement part of the gear shift position notification unit can be provided at low cost.

Furthermore, according to the bicycle gear shift operating apparatus of the third or sixth aspect, the pressure applied by the pressure unit achieves light operation of the gear shift operating lever unit.

Furthermore, according to the bicycle gear shift operating apparatus of the fourth or seventh aspect, a reverse input into the gear shift operating lever unit is shut off. Hence, the transmission can be maintained at a predetermined position.

Furthermore, according to the bicycle gear shift operating apparatus of the fifth aspect, it is possible to prevent the pressure applied by the pressure unit from acting in the direction that cancels the reverse input out when the gear shift operating lever unit is not operated. Hence, the transmission can be maintained at a predetermined position.

BRIEF DESCRIPTION OF THE DRAWINGS

FIG. 11(a) is a vertical cross-sectional view. FIG. 11(b) is a cross-sectional view taken along line H-H of FIG. 11(a).

DESCRIPTION OF THE EMBODIMENTS

An embodiment of the present invention is described hereinafter. FIGS. 1 to 10 are diagrams illustrating the present embodiment.

[Gear Shift Operating Apparatus]

Firstly, a schematic configuration of a gear shift operating apparatus 100 is described.

Figure 1:
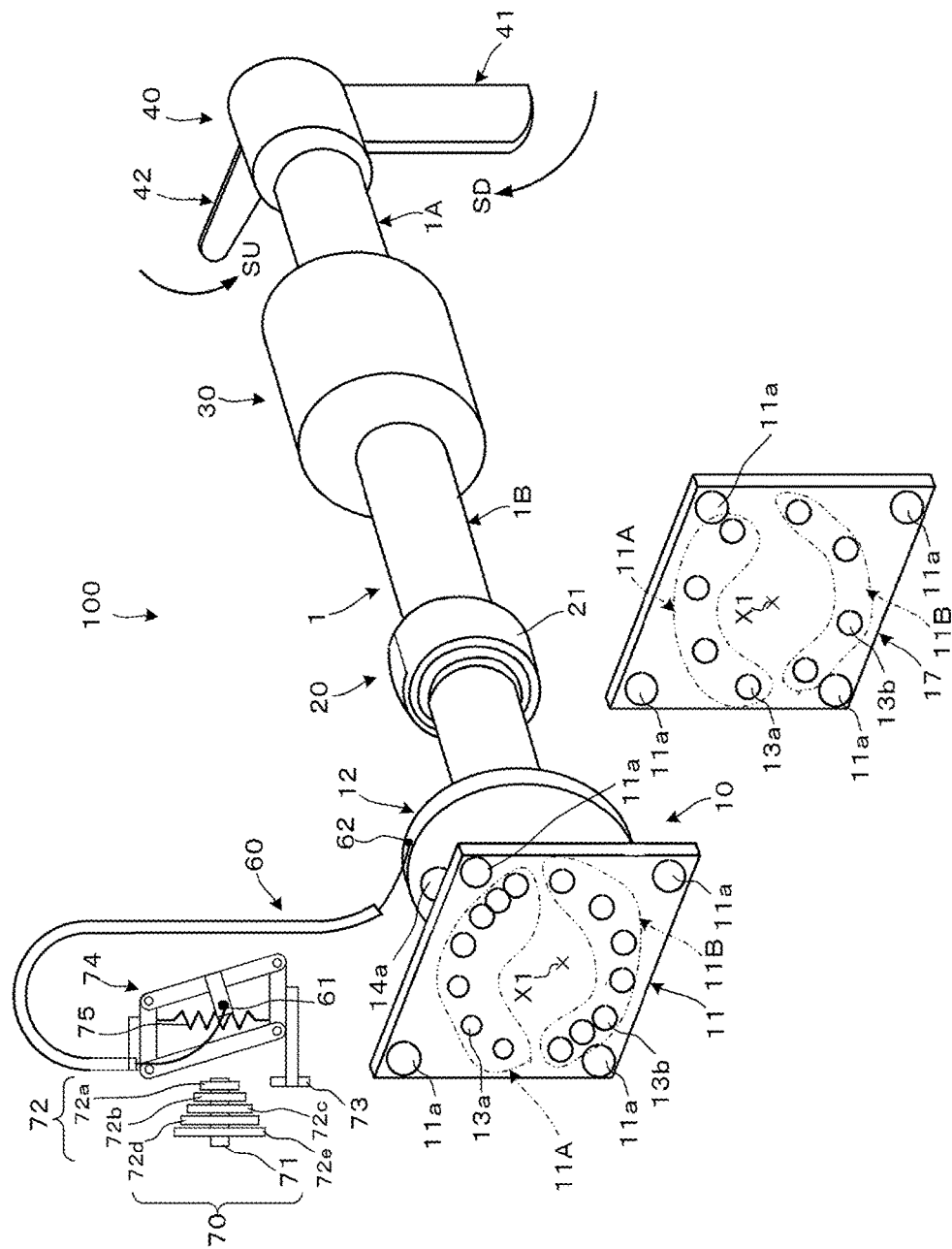
FIG. 1 is a schematic diagram of a gear shift operating apparatus 100.
Figure 2:
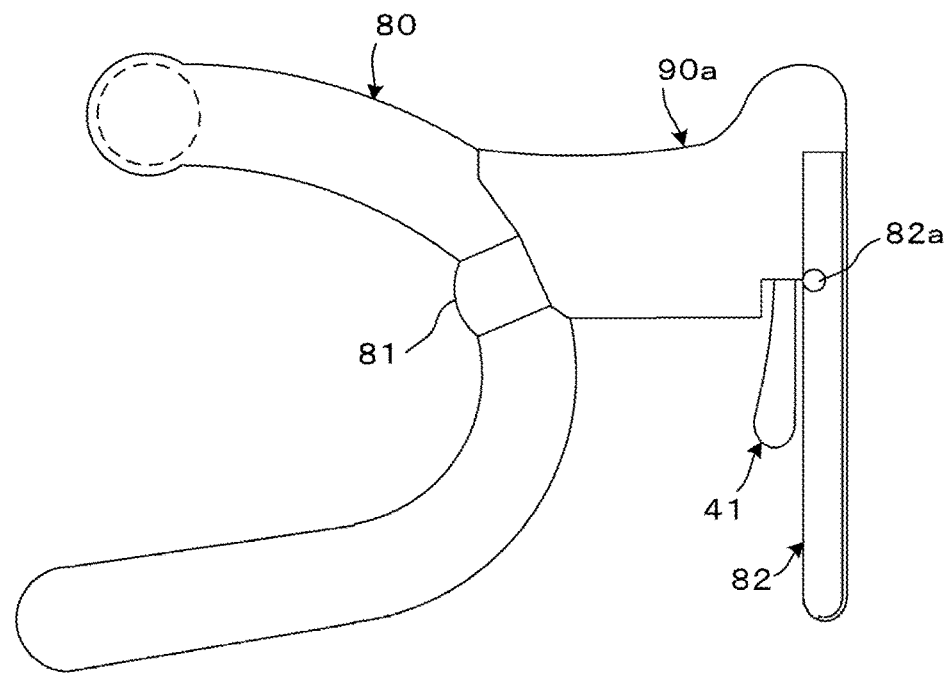
FIG. 2 is a side view of the gear shift operating apparatus 100.
Figure 3:
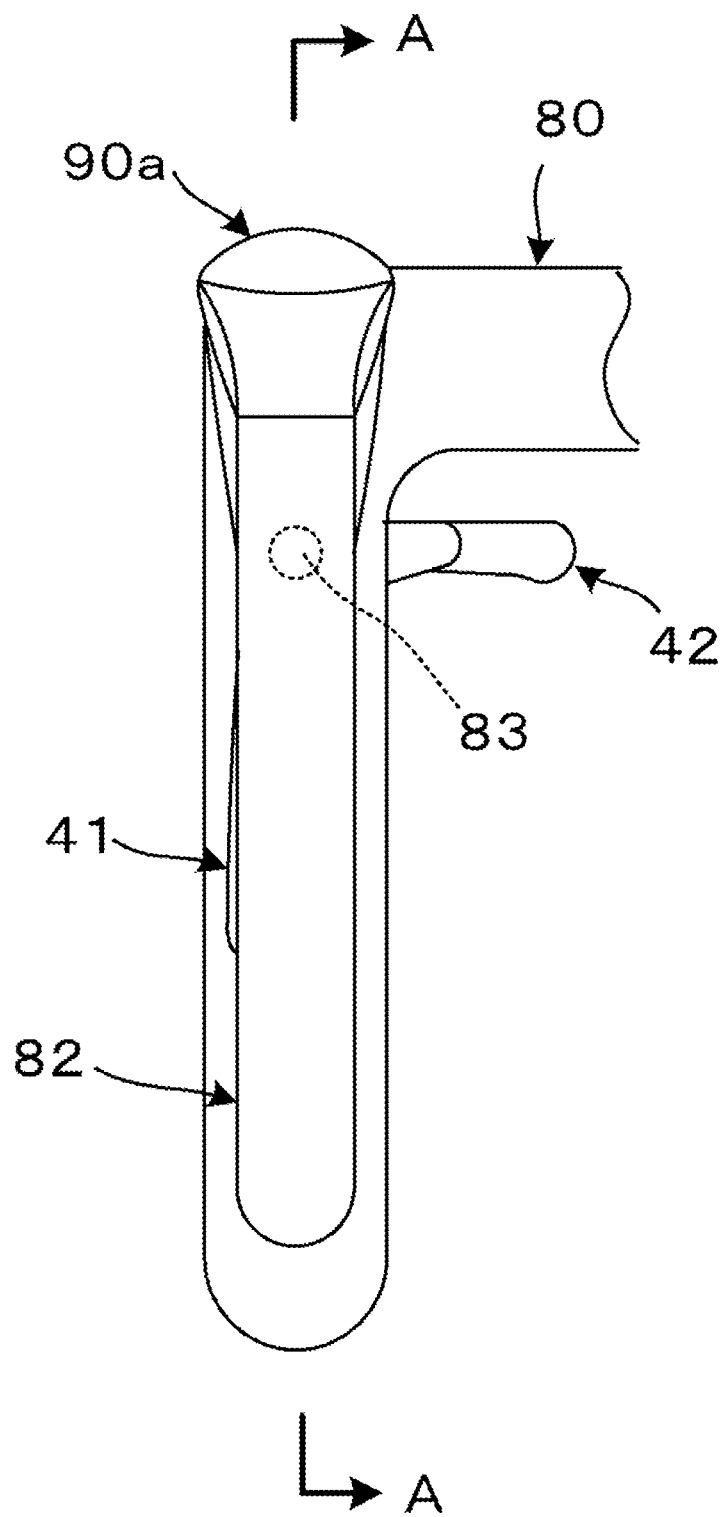
FIG. 3 is a front view of the gear shift operating apparatus 100.
Figure 4:
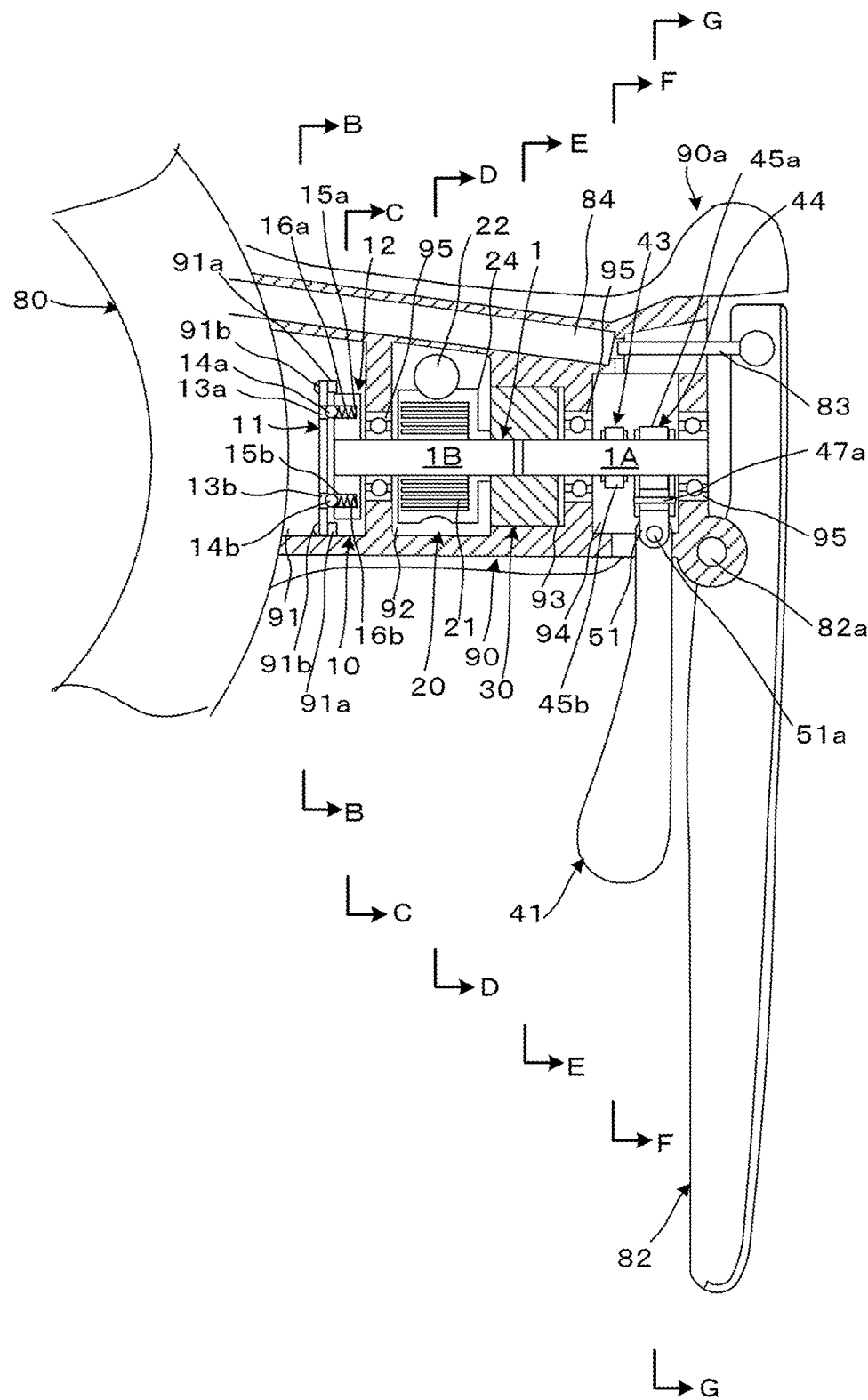
FIG. 4 is a cross-sectional view taken along line A-A of FIG. 3.

FIG. 1 is a schematic diagram of a gear shift operating apparatus 100. FIG. 2 is a side view of the gear shift operating apparatus 100. FIG. 3 is a front view of the gear shift operating apparatus 100. FIG. 4 is a cross-sectional view taken along line A-A of FIG. 3.

In FIG. 1, the gear shift operating apparatus 100 includes an operating shaft 1, a gear shift position notification unit 10, a pressure unit 20, a reverse input shutoff unit 30, and a gear shift operating lever unit 40 having a first operating lever 41 for shifting down and a second operating lever 42 for shift-up operation. The gear shift position notification unit 10 is placed at a rear end side, which is the left side in FIG. 1, of the operating shaft 1. Furthermore, the pressure unit 20, the reverse input shutoff unit 30, and the gear shift operating lever unit 40 are placed in this order toward a distal end side, which is the right side, of the operating shaft 1.

The gear shift operating apparatus 100 is coupled to a rear derailleur 70 via a shift cable 60.

The configuration of the rear derailleur 70 is described briefly. The rear derailleur 70 includes a link mechanism 74 having a plurality of transmission gears 72 (72a, 72b, 72c, 72d, and 72e) connected to an axle shaft 71 and a pulley 73 with a chain (not illustrated) strung over it. Moreover, the rear derailleur 70 includes a tension spring 75 that biases the link mechanism 74 in a predetermined direction (to the highest transmission gear 72a side in FIG. 1). One end 61 of the shift cable 60 is fixed to the link mechanism 74. The other end 62 is fixed to a second member 12. The second member 12 is also used as a pulley, around which the shift cable is wound, of the gear shift position notification unit 10, the pulley being described below.

When the first operating lever 41 is operated and rotated in a shift-down direction SD, the operating shaft 1 rotates in the shift-down direction SD. The shift cable 60 is then wound around the second member 12. At this point in time, the pulley 72 moves from the smaller-diameter gear 72a side to the larger-diameter gear 72e side. Hence, the link mechanism 74 is driven against the spring force of the tension spring 75. Hence, the spring force of the tension spring 75 acts on the operating shaft 1 in a shift-up direction SU opposite to the shift-down direction SD. When the second operating lever 42 is operated and rotated in the shift-up direction SU, the operating shaft 1 rotates in the shift-up direction SU. The shift cable 60 wound around the second member 12 is then unwound by the spring force of the tension spring 75.

Note that the rear derailleur 70 is used to describe the relationship between the gear shift operation and the direction in which the spring force of the tension spring 75 acts, and the relationship between the gear shift position and the rotation stop position at the gear shift position notification unit 10. However, the present invention is not limited by the configuration of the rear derailleur 70.

The gear shift operating apparatus 100 is placed in a grip body unit 90 as illustrated in FIGS. 2 to 4. The grip body unit 90 is detachably attached to a bicycle handlebar 80 via an attachment fitting 81. The grip body unit 90 is made of, for example, a reinforced plastic. A rubber cover 90a is mounted on an ouster side of the grip body unit 90. A brake lever 82 is attached to the grip body unit 90.

In FIGS. 1 and 4, a first chamber 91, a second chamber 92, a third chamber 93, and a fourth chamber 94 are formed in the grip body unit 90. The gear shift position notification unit 10 is placed in the first chamber 91. The pressure unit 20 is placed in the second chamber 92. The reverse input shutoff unit 30 is placed in the third chamber 93. A first one-way clutch mechanism 43 and a second one-way clutch mechanism 44 are placed in the fourth chamber 94. The operating shaft 1 is placed in such a manner as to penetrate the first chamber 91 to the fourth chamber 94. The operating shaft 1 is rotatably supported by ball bearings 95 that are placed at a plurality of points. A brake outer 84 in which a brake cable 83 is placed passes through the inside of the grip body unit 90.

The first chamber 91 is open at the rear end. When the grip body unit 90 is removed from the bicycle handlebar 80, the gear shift position notification unit 10 is exposed.

[Gear Shift Position Notification Unit]

Next, the configuration of the gear shift position notification unit 10 is described.

Figure 5:
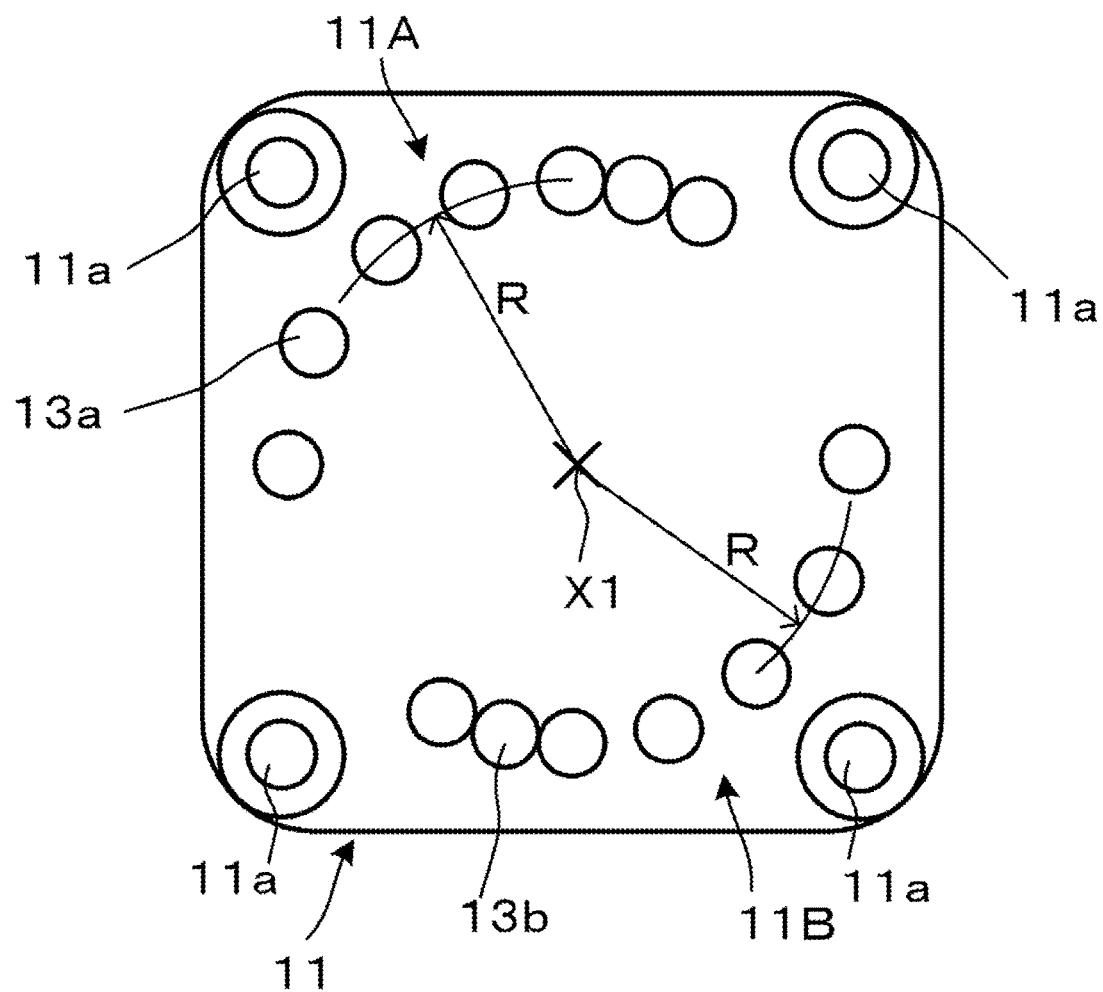
FIG. 5 is a cross-sectional view taken along line B-B of FIG. 4 and a front view of a first member 11.
Figure 6:
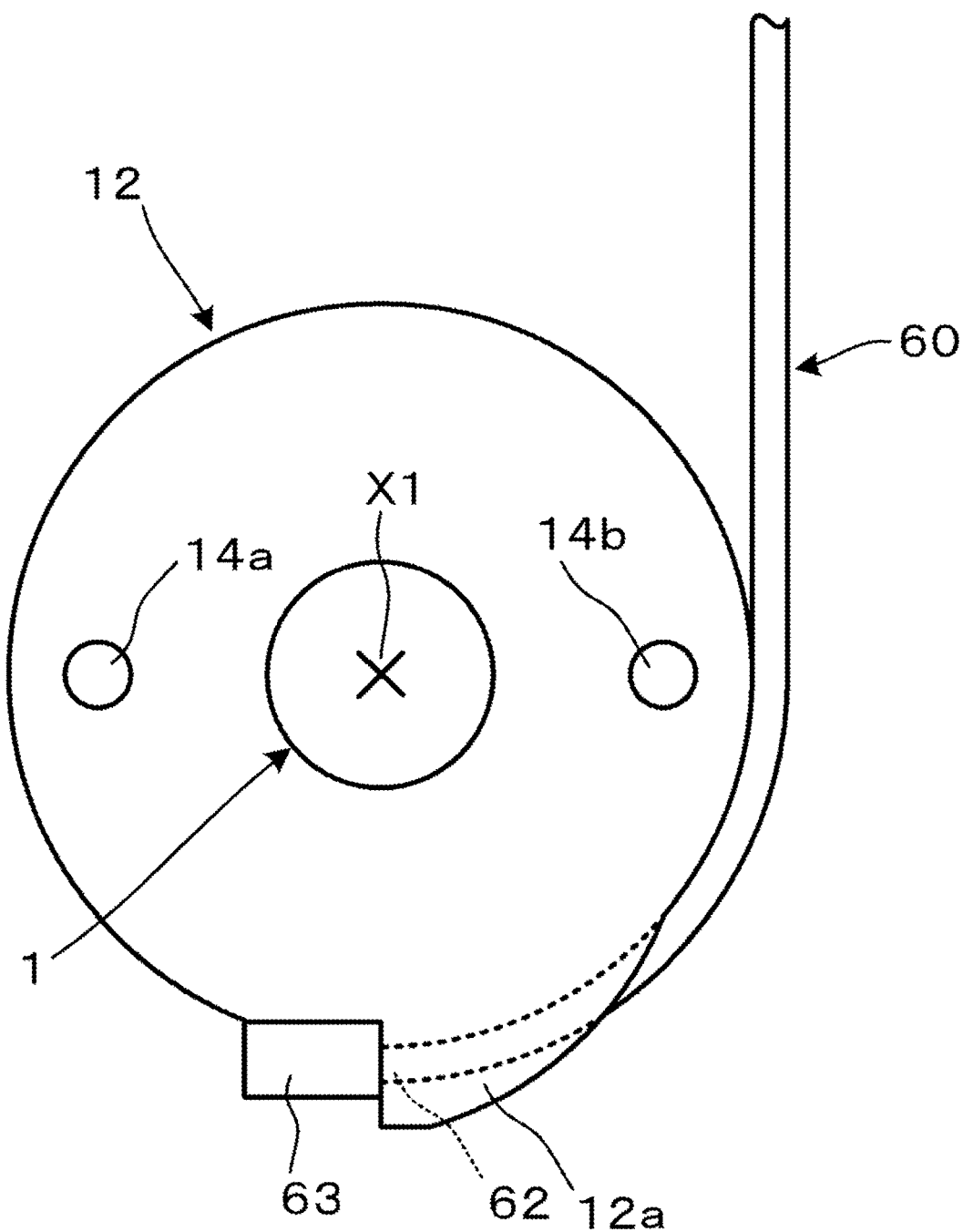
FIG. 6 is a cross-sectional view taken along line C-C of FIG. 4 and a front view of a second member 12.

FIG. 5 is a cross-sectional view taken along line B-B of FIG. 4 and a front view of a first member 11. FIG. 6 is a cross-sectional view taken along line C-C of FIG. 4 and a front view of the second member 12.

The gear shift position notification unit 10 includes the first member 11 and the second member 12. In the present embodiment, the gear shift position notification unit 10 employs the following click notification configuration. According to this configuration, the relative rotation of the first member 11 and the second member 12 allows notifying the gear shift position with the clicking feeling. The rotation of the first operating lever 41 and the second operating lever 42 is then stopped. The first member 11 includes a flat plate-shaped plate member. Pluralities of engagement holes 13a and 13b are formed on a circle with a radius R with a center point X1 as the center. The engagement holes 13a and 13b are divided into a first group 11A and a second group 11B, and form engagement portions that are notification position portions. The plurality of engagement holes 13a formed in the first group 11A and the plurality of engagement holes 13b formed in the second group 11B are formed in such a manner as to be symmetric with a rotation of 180 degrees with the center point X1 as the center.

The second member 12 is formed into a disc shape having the center point X1 as the center. For example, a V-shaped groove is formed on an outer peripheral surface. Consequently, the second member 12 is configured in such a manner as to be also capable of serving as the pulley. The first member 11 and the second member 12 are placed and opposed in such a manner that the position of the rotation center X1 of the operating shaft 1 is aligned with the positions of their center points X1. A first click ball 14a and a second click ball 14b, which form engagement bodies as a notification operating portion, are placed on an opposed surface (rear surface) of the second member 12 to the first member 11 in such a manner as to be symmetric about the center point X1. As illustrated in FIG. 4, the first click ball 14a and the second click ball 14b are inserted into blind ball hole portions 15a and 15b formed in the second member 12. Click springs 16a and 16b are placed in the ball hole portions 15a and 15b. The ball hole portions 15a and 15b press the first click ball 14a and the second click ball 14b toward an opposed surface (front surface) of the first member 11.

As illustrated in FIG. 6, an engagement protrusion 12a is formed on an outer peripheral portion of the second member 12. The engagement protrusion 12a is engaged with and fixed to the other end 62 of the shift cable 60. A retaining member 63 is fixed to the other end 62 of the shift cable 60. The retaining member 63 is engaged with the engagement protrusion 12a. The second member 12 rotates in the shift-down direction SD. Consequently, the shift cable 60 is wound around the second member 12 also serving as the pulley that forms a shift cable winding portion.

In the present embodiment, the second member 12 is fixed to the rear end of the operating shaft 1. The first member 11 is detachably fixed to mounting portions 91a of the first chamber 91 via screws 91b. As illustrated in FIG. 5, hole portions 11a through which the screws 91b pass are formed at four corners of the first member 11.

The first member 11 is placed at a position rearward of the second member 12. The first member 11 has a slight gap. The first click ball 14a and the second click ball 14b are pressed against the front surface of the first member 11 by the elastic force of the click springs 16a and 16b. The first click ball 14a and the second click ball 14b press the first member 11 at positions that are symmetric about a point, which offers a good balance.

When the operating shaft 1 rotates, the second member 12 rotates integrally with the operating shaft 1. The plurality of engagement holes 13a formed in the first group 11A and the plurality of engagement holes 13b formed in the second group 11B are formed at rotation angle positions corresponding to gear shift positions of the rear derailleur 70. For example, the shift cable 60 moves to move the pulley 73 from the transmission gear 70a to the transmission gear 70b. Let the rotation angle of the operating shaft 1 corresponding to the moving distance be θ1. The first operating lever 41 is operated to rotate the second member 12 by the angle θ1 via the operating shaft 1. The first click ball 14a and the second click ball 14b are then engaged with a click with a predetermined engagement hole 13a of the first group 11A and a predetermined engagement hole 13b of the second group 11B.

In other words, the pluralities of engagement holes 13a and 13b are formed in accordance with the gear shift positions of the rear derailleur 70. Consequently, the first click ball 14a and the second click ball 14b are engaged at each gear shift position with a click with the engagement holes 13a and 13b formed at a rotation angle position corresponding to the gear shift position. The rotation of the first operating lever 41 and the second operating lever 42 is stopped.

Therefore, if the rear derailleur 70 is replaced with a derailleur of other specifications, the first member 11 is simply required to be replaced with a new first member 17 described below. The first member 17 includes the pluralities of engagement holes 13a and 13b formed at rotation angle positions in accordance with gear shift positions of the derailleur replaced. When the grip body unit 90 is removed from the bicycle handlebar 80, the old first member 11 is exposed to the rear surface of the grip body unit 90. Hence, the replacement with the new first member 17 can be easily made.

[Pressure Unit]

Next, the configuration of the pressure unit 20 is described.

Figure 7:
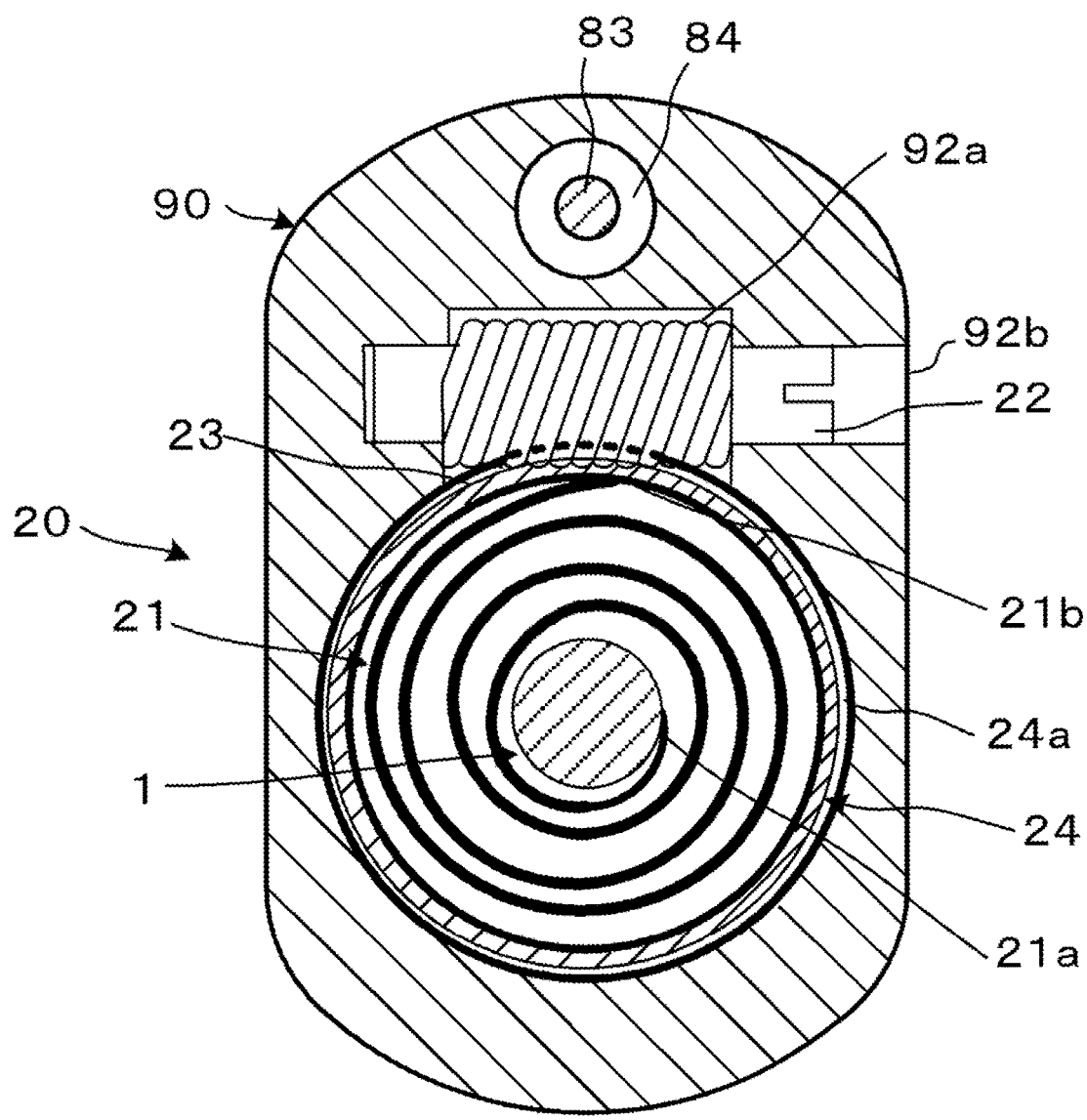
FIG. 7 is a cross-sectional view taken along line D-D of FIG. 4.

FIG. 7 is a cross-sectional view taken along line D-D of FIG. 4.

The pressure unit 20 includes, for example, a spiral spring 21 as illustrated in FIGS. 1, 4, and 7. The stored rotational force is applied to the operating shaft 1 toward the shift-down SD side. In the present embodiment, when the operating shaft 1 rotates in the shift-down direction SD, the spring force of the tension spring 75 acts as the reaction force. Hence, when the first operating lever 41 is operated and rotated in the shift-down direction SD, the first operating lever 41 feels heavy due to the reaction force of the tension spring 75.

In the present embodiment, the spring force of the spiral spring 21, which is applied to the operating shaft 1, acts in a direction that negates (cancels out) the reaction force of the tension spring 75. Hence, when the first operating lever 41 is operated and rotated in the shift-down direction SD, the spring force stored in the spiral spring 21 is added to the operating shaft 1. Hence, the first operating lever 41 can be operated with a small force. Note that the spring force of the spiral spring 21 is set in a range that is smaller than the spring force of the tension spring 75, and does not influence the tension of the shift cable 60.

As illustrated in FIG. 4, a housing 24 is placed in the pressure unit 20 in such a manner as to be rotatable about the axis of the operating shaft 1. The right-handed spiral spring 21 is housed in the second chamber 92 of the housing 24. Flanges 24a are placed, opposed to each other, in the front and the rear in the axial direction in the housing 24. A worm wheel 23 is formed in the circumferential direction between the pair of flanges 24a. The operating shaft 1 penetrates the center portion of the spiral spring 21. An inner end 21a of the spiral spring 21 is fixed to the operating shaft 1. A worm chamber 92a is formed in the grip body unit 90 in such a manner as to face the second chamber 92. A worm 22 for pressure adjustment is placed in the worm chamber 92a in an orthogonal direction to the axial direction of the operating shaft 1 in such a manner as to be rotatable and immovable along the axial direction of the worm 22. An opening 92b is formed on one end side of the worm chamber 92. When a screwdriver that is inserted through the opening 92b rotates the worm 22, the worm wheel 23 meshing with the worm 22 rotates around the operating shaft 1.

Furthermore, the housing 24 rotates around the operating shaft 1. An outer end 21b of the spiral spring 21 is fixed to the inner peripheral surface of the housing 24. The spring force of the spiral spring 21 is applied to between the grip body unit 90 and the operating shaft 1 via the housing 24 and the worm 22. Assume that the grip body unit 90 is the fixed side. The spring force of the spiral spring 1 is applied to the operating shaft 1 in the shift-down direction SD. The rotation of the worm 22 allows the housing 24 to rotate in the shift-up direction SU or the shift-down direction SD. Consequently, the spring force of the spiral spring 21 can be adjusted.

[Reverse Input Shutoff Unit]

Next, the configuration of the reverse input shutoff unit 30 is described. As illustrated in FIG. 4, the operating shaft 1 is split into an input shaft portion 1A and an output shaft portion 1B in the reverse input shutoff unit 30. The rotation of the input shaft portion 1A in the shift-up direction SU and the shift-down direction SD is transmitted to the output shaft portion 1B. Conversely, the transmission of the rotational force from the output shaft portion 1B to the input shaft portion 1A in the shift-down direction SD is shut off. The gear shift operating lever unit 40 is placed on the input shaft portion 1A. The pressure unit 20 and the gear shift position notification unit 10 are placed on the output shaft portion 1B.

In other words, even if the rotational force is added to the output shaft portion 1B by the spring force of the tension spring 75, the transmission of the rotational force to the gear shift operating lever unit 40 (the reverse input) is shut off. Hence, the rear derailleur 70 can be maintained at a predetermined position.

Moreover, when the pressure applied by the pressure unit 20 acts in the direction that negates the spring force of the tension spring 75, the chain is likely to come off the transmission gear. However, the output shaft portion 1B does not rotate in the shift-down direction SD except when the rotational force is transmitted from the input shaft portion 1A. Hence, the pressure applied by the pressure unit 20 does not influence the tension of the chain based on the spring force of the tension spring 75. Hence, it is possible to prevent the chain from coming off the transmission gear.

Figure 8:
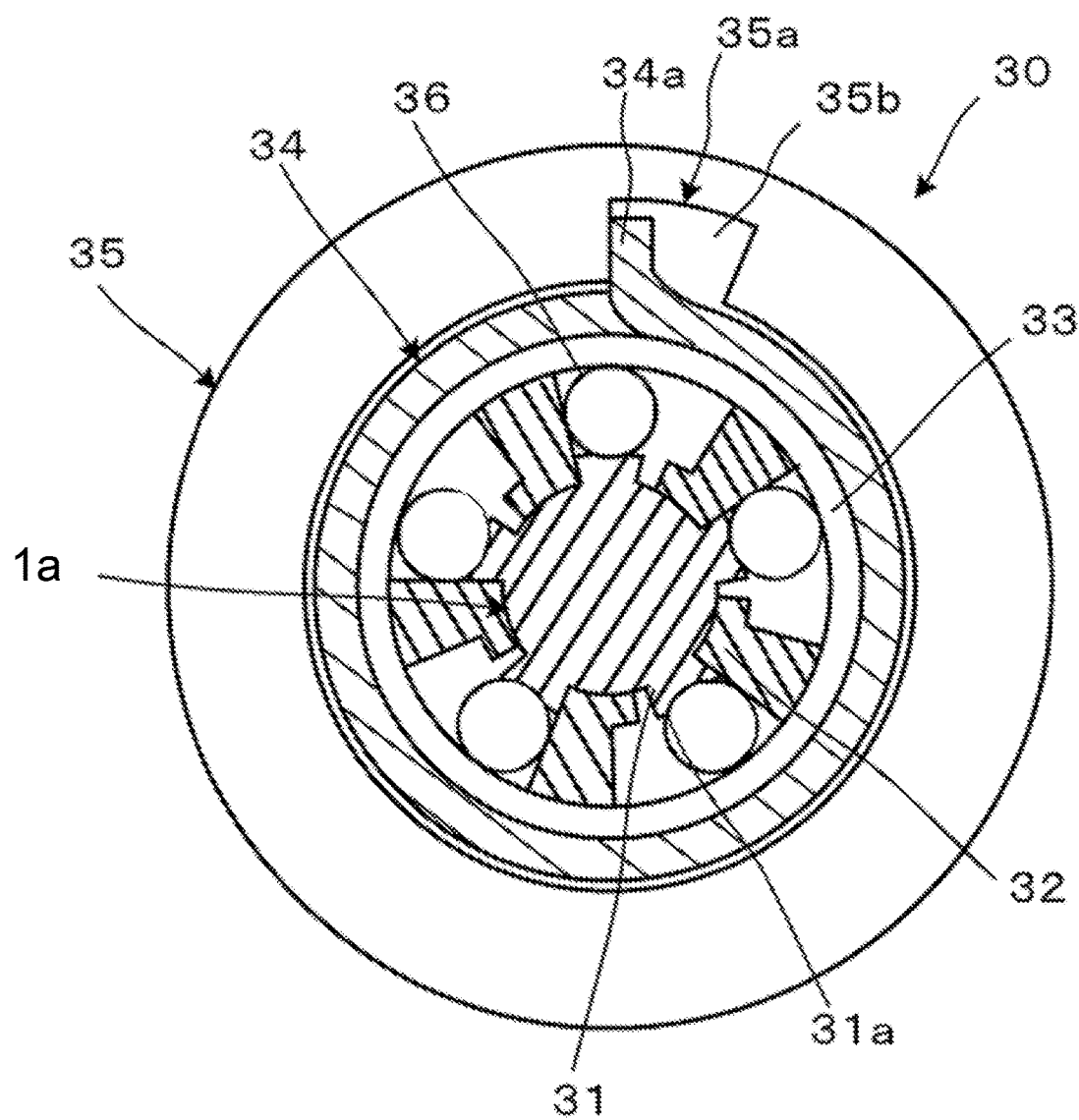
FIG. 8 is a cross-sectional view taken along line E-E of FIG. 4.

FIG. 8 is a cross-sectional view taken along line E-E of FIG. 4. As illustrated in FIG. 8, the reverse input shutoff unit 30 includes the output shaft portion 1B (not shown in FIG. 8) coupled to the input shaft portion 1A, a tube portion 33, a helical torsion spring 34, a fixed member 35, and rolling engagement bodies 36. Five output protrusions 31 are formed on the outer peripheral portion of the output shaft portion 1B, protruding outward in the radial direction. The input shaft portion 1A includes five input engagement pieces 32 placed between the output protrusions 31. The five input engagement pieces 32 are placed on the inner side of the tube portion 33 in such a manner as to be rotatable. The helical torsion spring 34 configured to be right-handed is placed on the outer side of the tube portion 33. The fixed member 35 is placed on the outer peripheral side of the fastening member 34. The rolling engagement body 36 includes, for example, a steel ball or roller.

A spring end 34a on either side of the helical torsion spring 34, the spring end 34a being engaged with a notch engagement portion 35a of the fixed member 35, has a gap 35b in the circumferential direction. The tube portion 33 is placed in the helical torsion spring 34 in such a manner as to be rotatable with a predetermined frictional force. When the tube portion 33 rotates in the shift-down direction SD being a winding direction of the helical torsion spring 34, the helical torsion spring 34 is twisted tighter to reduce its inner diameter. Therefore, the tube portion 33 is coupled to the fixed member 35 via the helical torsion spring 34. As a result, the tube portion 33 cannot rotate in the shift-down direction SD.

Conversely, when the tube portion 33 rotates in the shift-up direction SU opposite to the twisting direction of the helical torsion spring 34, the twisting action of the helical torsion spring 34 does not work. Hence, a rotational force equal to or greater than the predetermined frictional force causes the tube portion 33 to rotate in the shift-up direction SU.

On the one hand, the rolling engagement body 36 is placed between the inner peripheral surface of the tube portion 33 and a distal end surface 31a of the output protrusion 31. The distal end surface 31a of the output protrusion 31 is formed into a flat surface. When the input shaft portion 1A rotates in the shift-down direction SD, the input engagement piece 32 comes into contact with the output protrusion 31. At the same time, the input engagement piece 32 comes into contact with the rolling engagement body 36. In this manner, the input engagement piece 32 is positioned in a center portion on the inner peripheral surface of the output protrusion 31. In this manner, the rolling engagement body 36 is held in an unlocked state. The input shaft portion 1A rotates the output shaft portion 1B in the shift-down direction SD.

On the other hand, when the input shaft portion 1A rotates in the shift-up direction SU, the input engagement piece 32 comes into contact with its adjacent output protrusion 31. However, the contact between the input engagement piece 32 and the rolling engagement body 36 is cancelled. In this manner, the restriction on the position of the rolling engagement body 36 is lifted. In this state, the input engagement piece 32 rotates the output protrusion 31 in the shift-up direction SU. At the same time, the rolling engagement body 36 moves away from the center portion on the distal end surface 31a of the output protrusion 31. In this manner, the inner tube 33 and the output protrusions 31 are locked. In this locked state, the inner tube 33 becomes integrated with the output shaft portion 1B. As described above, the inner tube 33 is allowed to rotate in the shift-up direction SU with respect to the fixed member 35.

In other words, when the rotation operation in the shift-down direction SD by the first operating lever 41 and the rotation operation in the shift-up direction SU by the second operating lever 42 are performed on the input shaft portion 1A, the rotational force is transmitted to the output shaft portion 1B.

Next, when the rotational force in the shift-down direction SD is added to the output shaft portion 1B, the output protrusion 31 moves away from the input engagement piece 32. The restriction on the position of the rolling engagement body 36 by the input engagement piece 32 is then lifted. As a result, the rolling engagement body 36 locks the inner tube 33 and the output protrusion 31. In this locked state, the rotational force in the shift-down direction SD is added to the inner tube 33. However, as described above, the twisting action of the helical torsion spring 34 allows the inner tube 33 to be fixed to the fixed member 35. Therefore, a reverse input added in the shift-down direction SD by the output shaft portion 1B is not transmitted to the input shaft portion 1A.

Moreover, when a reverse input in the shift-up direction SU is added by the output shaft portion 1B, the restriction on the position of the rolling engagement body 36 by the input engagement piece 32 is imposed. The output protrusion 31 and the inner tube 33 are then maintained in the unlocked state. The output protrusion 31 then presses the input engagement piece 32 in the shift-up direction SU. In this manner, the reverse input from the output shaft portion 1B is transmitted to the input shaft portion 1A.

[Torque Limiter]

Even if the rotation in the shift-down direction SD is added to the output shaft portion 1B, the reverse input shutoff unit 30 does not allow the output shaft portion 1B to rotate. Hence, for example, the addition of a great external force to the rear derailleur during a bicycle fall may allow the rear derailleur to move largely in the shift-down direction SD. At this point in time, a large torque may be added to the output shaft portion 1B to damage the reverse input shutoff unit 30. Hence, a torque limiter can be provided to the reverse input shutoff unit 30 or the output shaft portion 1B. Consequently, even if a predetermined or greater torque is added to the output shaft portion 1B, the actuated torque limiter can prevent damage to the reverse input shutoff unit 30. The configuration of the torque limiter is not particularly limited.

The helical torsion spring 34 and a shaft member are locked by a frictional force in a mechanism where the helical torsion spring 34 twisted tighter around the shaft member locks a reverse input from the output shaft portion 1B with the reverse input, as in the reverse input shutoff unit 30 illustrated in FIG. 8. Hence, if a reverse input torque that exceeds the frictional force is added to the output shaft portion 1B, the output shaft portion 1B rotates. Then, the reverse input shutoff unit 30 can be prevented from being damaged. In other words, the reverse input shutoff unit 30 illustrated in FIG. 8 has a configuration including the torque limiter.

[Gear Shift Operating Lever Unit] Next, the configuration of the gear shift operating lever unit 40 is described.

As illustrated in FIGS. 1 to 4, the second operating lever 42 for shift-up operation is placed rearward of the first operating lever 41 for shifting down in the gear shift operating lever unit 40. The first operating lever 41 is placed rearward of and parallel to the brake lever 82 along the up-and-down direction. The second operating lever 42 extends inward, substantially alongside the handlebar 80. A rider of the bicycle can operate the first operating lever 41 and the second operating lever 42 in a state of gripping the handlebar 80, or with the fingers of the hand gripping the grip body unit 90.

The first operating lever 41 is coupled to the operating shaft 1 via the first one-way clutch mechanism 43. The second operating lever 42 is coupled to the operating shaft 1 via the second one-way clutch mechanism 44.

Figure 9:
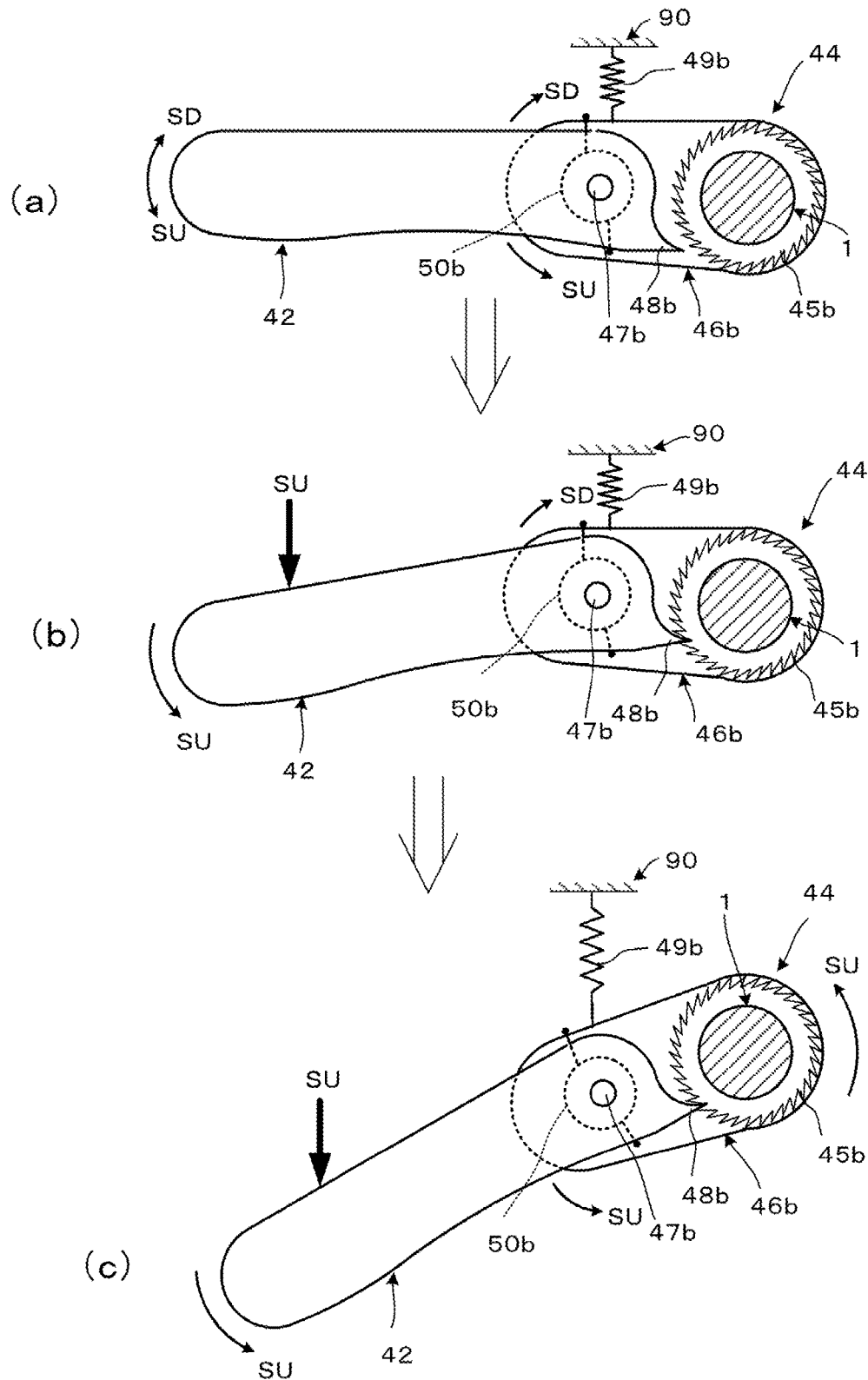
FIGS. 9(a) to 9(c) are cross-sectional views taken along line F-F of FIG. 4 and diagrams explaining a shift-up lever operation.

Next, the configuration of the second clutch mechanism 44 is described on the basis of FIGS. 4 and 9.

FIGS. 9(a) to 9(c) are cross-sectional views taken along line F-F of FIG. 4 and diagrams explaining a shift-up lever operation. FIG. 9(a) illustrates an operation standby position of the second operating lever 42. FIG. 9(b) illustrates an operation start position. FIG. 9(c) illustrates a shift-up operation position.

The second clutch mechanism 44 includes a second ratchet gear 45b fixed to the operating shaft 1, and a second link plate 46b that is rotatably attached to the operating shaft 1. The second operating lever 42 is rotatably attached to the second link plate 46b via a second support shaft 47b that is parallel to the operating shaft 1. A second ratchet pawl 48b that engages the second ratchet gear 45b is formed at a distal end portion of the second operating lever 42. Ratchet teeth are formed toward the shift-up direction SU on the second ratchet gear 45b.

The second link plate 46b is biased in the shift-down direction SD by a second link plate spring 49b provided between the second link plate 46b and the grip body unit 90. The second link plate 46b comes into contact with an unillustrated stopper, and stands by at the operation standby position. The second operating lever 42 is biased in the shift-down direction SD by a second lever spring 50b provided between the second operating lever 42 and the second link plate 46b. The second operating lever 42 comes into contact with an unillustrated stopper and stands by at an engagement retraction position. At the engagement retraction position, the second ratchet pawl 48b is retracted from the ratchet teeth of the second ratchet gear 45. Moreover, the spring force of the second link plate spring 49b is set to be stronger than the spring force of the second lever spring 50b.

If the second operating lever 42 is not operated in the shift-up direction SU at the operation standby position of the second operating lever 42 illustrated in FIG. 9(a), the second clutch mechanism 44 is in a non-engaged state with the second ratchet gear 45b. Hence, the operation of the first operating lever 41 in the shift-down direction SD allows the operating shaft 1 to rotate.

The second operating lever 42 is operated in the shift-up direction SU, starting at the operation standby position of the second operating lever 42 illustrated in FIG. 9(a). The second operating lever 42 then rotates with respect to the second link plate 46b against the spring force of the second lever spring 50b as illustrated in FIG. 9(b). The second ratchet pawl 48b then engages the ratchet teeth of the second ratchet gear 45b.

Furthermore, the second operating lever 42 rotates in the shift-up direction SU. As illustrated in FIG. 9(c), the second operating lever 42 then rotates in the shift-up direction SU integrally with the second link plate 46b, and rotates the operating shaft 1 in the shift-up direction SU via the second ratchet gear 45b. When the control force on the second operating lever 42 is released, the second operating lever 42 and the second link plate 46b return to the operation standby position illustrated in FIG. 9(a). In terms of this shift-up operation, a short shift-up operation is repeated, or a large shift-up operation is performed, so as to allow the operating shaft 1 to rotate to a predetermined rotation angle position corresponding to the gear shift position.

The rotation operation in the shift-up direction SU by the second operating lever 42 allows the spiral spring 21 to store the force.

Figure 10:
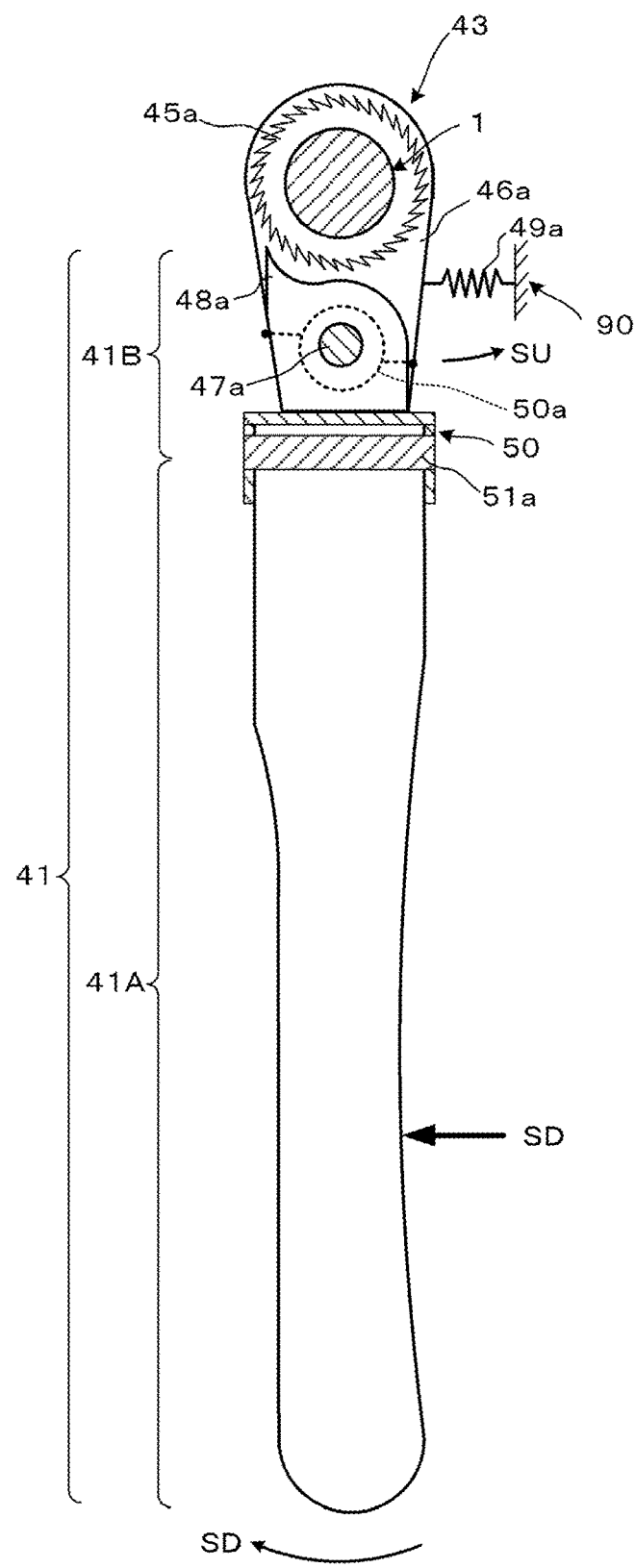
FIG. 10 is a cross-sectional view taken along line G-G of FIG. 4.

Next, the configuration of the first one-way clutch mechanism 43 is described on the basis of FIG. 10. Note that the first one-way clutch mechanism 43 basically has the same configuration as the second one-way clutch mechanism 44. Hence, in terms of the same members, the term "first" is written instead of the terms "second" assigned before their names. Then, "a" is assigned instead of a subscript "b" presented after a number of a reference numeral. A further description is then omitted.

FIG. 10 is a cross-sectional view taken along line G-G of FIG. 4.

Ratchet teeth of a first ratchet gear 45a point in the shift-down direction SD. A first ratchet pawl 48a provided to the distal end portion of the first operating lever 41 is provided at a position opposite to the second ratchet pawl 48b. A first link plate 46a is biased by a first link plate spring 49a in the shift-up direction SU with respect to the grip body unit 90, and stands by at the operation standby position that comes into contact with an unillustrated stopper.

The first operating lever 41 is rotatably attached to the first link plate 46a by a first support shaft 47a that is parallel to the operating shaft 1. The first operating lever 41 is biased in the shift-up direction SU by the spring force of a weak first lever spring 50a that has a weaker spring force than the first link plate spring 49a.

The first operating lever 41 is split into two, a lever body portion 41A and an engagement pawl portion 41B, via a hinge member 51 provided at a position below the first support shaft 47a. A hinge shaft 51a provided to the hinge member 51 is orthogonal to the first support shaft 47a. The first support shaft 47a is placed parallel to a support shaft 82a of the brake lever 82 as illustrated in FIG. 4. Therefore, when the brake lever 82 is rotated by the operation of the brake lever 82, the lever body portion 41A pressed by the brake lever 82 rotates on the hinge shaft 51. Consequently, the operation of the brake lever 82 is not inhibited.

The first operating lever 41 rotates in the shift-down direction SD against the spring force of the first lever spring 50a. The first engagement pawl 48a then meshes with the ratchet teeth of the first ratchet gear 45. Furthermore, the first operating lever 41 rotates in the shift-down direction SD. The first operating lever 41 then rotates the operating shaft 1 in the shift-down direction, integrally with the first link plate 46a, via the first ratchet gear 45a against the spring force of the first link plate spring 47a. When the finger is taken off the first operating lever 41, the first operating lever 41 returns to the operation standby position illustrated in FIG. 10, and waits for the next shift-down action. In terms of this shift-down operation, a short shift-down operation is repeated, or a large shift-down operation is performed, so as to allow the operating shaft 1 to rotate to a predetermined rotation angle position corresponding to the gear shift position. Moreover, the shift-up operation can be performed by the second operating lever 42 in the state in which the first operating lever 41 is back at the operation standby position.

Note that in the present embodiment, when the rotation operation in the shift-down direction SD is performed on the first operating lever 41, the spring force of the pressure unit 20 is added in the direction that cancels out the spring force of the tension spring 75. Hence, simply pressing the first operating lever 41 lightly allows for performing the shift-down operation.

Next, the effects of the present embodiment are described.

In the present embodiment, included are the gear shift operating lever unit 40, the operating shaft 1 that rotates by operating the gear shift operating lever unit 40 and winds and unwinds the shift cable 60, and the replaceable gear shift position notification unit 10. The rotation stop positions are set on the replaceable gear shift position notification unit 10. The rotation positions correspond respectively to the gear shift positions of the rear derailleur 70 that are switched in accordance with the rotation of the operating shaft 1.

Consequently, if the rear derailleurs 70 before and after replacement have different specifications, the gear shift position notification unit 10 is replaced with a gear shift position notification unit 10 provided for the rear derailleur 70 after replacement. Accordingly, the rear derailleur 70 after replacement can also find the gear shift position.

Hence, the gear shift operating lever unit 40 can be relatively easily stopped at the gear shift position. Hence, there is no need to replace, as before, all constituent parts of a component. The replacement of the rear derailleur 70 is sufficient.

Furthermore, in the present embodiment, the gear shift position notification unit 10 includes the first member 11 and the second member 12, which rotate relatively in accordance with the operation of the gear shift operating lever unit 40. The first member 11 has the notification position portions at the rotation angle positions corresponding to the gear shift positions of the rear derailleur 70. The second member 12 has the notification operating portion that notifies the rotation stop position in cooperation with the notification position portion. One or both of the first member 11 and the second member 12 can be replaced.

Consequently, the configuration of the gear shift position notification unit 10 can be simplified. Moreover, a reduction in the number of parts replaced can also be achieved. Hence, a replacement part of the gear shift position notification unit 10 can be provided at low cost.

Furthermore, in the present embodiment, the included pressure unit 20 applies the rotational force to the operating shaft 1 in the direction that cancels out the reverse input added from the rear derailleur 70 side via the shift cable 60.

Consequently, the pressure applied by the pressure unit 20 achieves light operation of the gear shift operating lever unit 40.

Furthermore, in the present embodiment, the included reverse input shutoff unit 30 transmits the rotational force inputted by the gear shift operating lever unit 40 and shuts off the transmission of the rotational force that is reversely inputted into the gear shift operating lever unit 40.

Consequently, the reverse input into the gear shift operating lever unit 40 is shut off. Hence, the rear derailleur 70 can be maintained at a predetermined position.

Furthermore, in the present embodiment, the reverse input shutoff unit 30 is placed between the gear shift operating lever unit 40 and the pressure unit 20.

Consequently, it is possible to prevent the pressure applied by the pressure unit 20 from acting in the direction that cancels the reverse input out when the gear shift operating lever unit 40 is not operated. Hence, the rear derailleur 70 can be maintained at a predetermined position.

Modification

Note that in the above embodiment, the reverse input shutoff unit 30 is employed. However, the reverse input shutoff unit is not limited to this, and another type of reverse input shutoff unit may also be employed.

Figure 11:
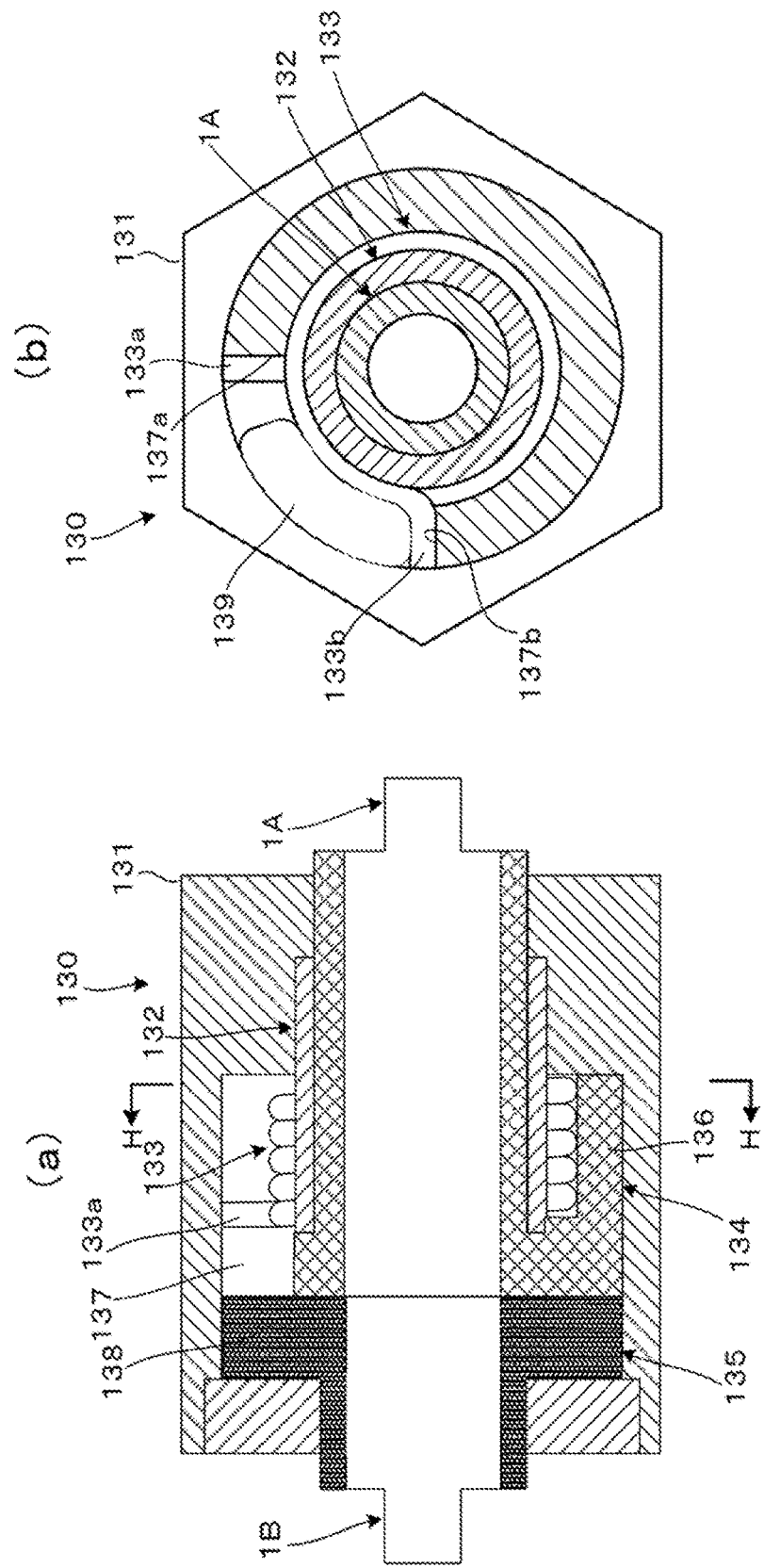
FIG. 11 illustrate another embodiment of a reverse input shutoff unit.

FIG. 11 illustrate another embodiment of a reverse input shutoff unit. FIG. 11(*a*) is a vertical cross-sectional view. FIG. 11(*b*) is a cross-sectional view taken along line H-H of FIG. 11(*a*). A reverse input shutoff unit 130 has a working principle similar to the reverse input shutoff unit 30 illustrated in FIG. 8. A different point is that a helical torsion spring 133 is used as a constituent member for shutting off a reverse input in the configuration that shuts off a reverse input in both of the shift-down direction SD and the shift-up direction SU. Consequently, if a predetermined or greater reverse input torque is added to the output shaft portion 1B in both of the shift-down direction SD and the shift-up direction SU, the helical torsion spring 133 and a cylindrical bushing member 132 around which the helical torsion spring 133 is twisted tighter function as a torque limiter. The bushing member 132 is placed around the perimeter of the input shaft portion 1A, and is fixed to a fixed housing 131 in such a manner as not to be rotatable. The helical torsion spring 133 is placed around the perimeter of the busing member 132. One end 133*a* and the other end 133*b*, which form engagement portions of the helical torsion spring 133, are provided with an angular difference of approximately 90 degrees about an axis.

An end portion 134 of the input shaft portion 1A and an end portion 135 of the output shaft portion 1B are placed in the fixed housing 131. The end portion 135 of the input shaft portion 1A has a disc-shaped flange portion 136. A part of the flange portion 136 is formed into a notch portion 137 that is a fan-shaped cut with an angle of approximately 90 degrees. The end portion 135 of the output shaft portion 1B has a disc-shaped flange portion 138. An engagement protrusion 139 is formed from a part of the flange portion 138 along the axial direction. The engagement protrusion 139 is loosely fitted into the notch portion 137 about the axis.

The one end 133*a* of the helical torsion spring 133 is engaged with one end side surface 137*a* of the notch portion 137. The other end 133*b* is engaged with the other end side surface 137*b* of the notch portion 137. The one end 133*a* and the other end 133*b* of the helical torsion spring 133 are engaged with the ends of the flange portion 136 of the input shaft portion 1A in the axial direction. Hence, even if the input shaft portion 1A is rotated in both of the shift-up direction SU and the shift-down direction SD, the helical torsion spring 133 does not tighten the bushing member 132.

On the other hand, when the output shaft portion 1B rotates in the shift-up direction SU, the engagement protrusion 139 presses the one end 133*a* of the helical torsion spring 133. Hence, the helical torsion spring 133 is twisted tighter around the bushing member 132. The rotation of the output shaft portion 1B is then locked. Moreover, when the output shaft portion 1B rotates in the shift-down direction SD, the engagement protrusion 139 presses the other end 133*b* of the helical torsion spring 133. Hence, the helical torsion spring 133 is twisted tighter around the bushing member 132. The rotation of the output shaft portion 1B is then locked. In other words, the rotation of the output shaft portion 1B in both directions are locked. Hence, a reverse input is shut off.

Furthermore, when a large torque that exceeds the spring force of the tension spring 75 is added to the output shaft portion 1B, the helical torsion spring 133 and the bushing member 132 slide. Consequently, the torque limiter woks to release the lock.

Both of the reverse input shutoff units 30 and 130 of FIGS. 8 and 11 illustrate examples of the mechanism that shuts off a reverse input. The present invention is not limited to these mechanisms. Any mechanism is acceptable as long as it is a mechanism that can shut off a reverse input.

Moreover, in the above embodiment, the gear shift operating apparatus 100 is connected to the rear derailleur 70. However, the gear shift operating apparatus 100 is not limited to this and can also be connected to a front derailleur.

Moreover, in the above embodiment and the modification thereof, the transmission may have any configuration. The transmission may be an internal gear hub or a derailleur.

Moreover, in the above embodiment and the modification thereof, the first member 11 is fixed to the grip body unit 90 in such a manner as to be replaceable. The second member 12 is then fixed to the operating shaft 1. However, the first member 11 may be fixed to the operating shaft 1. Furthermore, the second member 12 may be fixed to the grip body unit 90. In this case, it is simply required to remove the first member 11 from the operating shaft 1 after the second member 12 is removed. Moreover, both of the first member 11 and the second member 12 may be replaced. In other words, one or both of the first member 11 and the second member 12, which rotate relatively, are replaced, which, even if a replacement is made with a derailleur having different specifications, enables performing the gear shift operation on the derailleur after replacement with the feeling of operating the index type simply by replacing the gear shift position notification unit 10.

Moreover, in the above embodiment and the modification thereof, the gear shift position notification unit 10 and the gear shift operating lever unit 40 are placed at the end portions of the operating shaft 1. However, a configuration including the gear shift position notification unit 10 provided integrally with the gear shift operating lever unit 40 without using the operating shaft 1 is also possible. In this case, the rotation operation of the operating lever(s) (including not only the configuration having two operating levers of the first operating lever 41 and the second operating lever 42 that perform the shift-up and shift-down operations independently but also a configuration having one operating lever for the shift-up and shift-down operations) of the gear shift operating lever unit 40 allows the first member 11 and the second member 12 to rotate relatively. The other end 62 of the shift cable 60 is fixed to a shift cable winding portion, such as a pulley, that is provided to the gear shift operating lever unit 40. In this manner, with the shift-up operation or shift-down operation of the operating lever, the shift cable winding portion winds or unwinds the shift cable. The second member 12 winds, or may unwind, the shift cable 60 provided integrally with the gear shift operating lever unit 40.

For example, the configuration illustrated in FIG. 4 can also be employed as another configuration of the gear shift operating apparatus without the operating shaft 1. According to this configuration, the shift cable 60 is connected to the gear shift operating lever as in the connection structure of the brake lever 82 and the brake cable 83. In this manner, the gear shift operating lever is operated to pull or release the shift cable 60.

Moreover, in the configurations employed in the above embodiment and the modification thereof, the first member 11 and the second member 12 rotate relatively in the gear shift position notification unit 10. However, the gear shift position notification unit 10 is not limited to this configuration, and can also employ a configuration including a sliding member. For example, a replaceable gauge member where stop positions corresponding to the gear shift positions of the rear derailleur 70 are set is slidably housed in a case. Then, the shift cable 60 is coupled to the gauge member. The gear shift operating lever is then operated to slide the gauge member. In this manner, the gear shift operating lever stops in such a manner as to align the stop position of the gauge member with a reference position of the case.

Moreover, in the above embodiment and the modification thereof, the gear shift position notification unit 10 includes the click notification configuration having the notification function, as the configuration that notifies the gear shift position. According to this configuration, the click balls being the notification operating portion of the second member 12 are engaged at the gear shift position with the engagement holes 13a and 13b being the notification position portion of the first member 11. Consequently, the operating lever of the gear shift operating lever unit 40 can be stopped with the clicking feeling. The gear shift position notification unit of the present invention is not limited to the click notification configuration. For example, the following configuration can also be employed. According to this configuration, mark portions being the notification position portions that display the gear shift positions are provided to the first member 11. The second member 12 as an indicator being the notification operating portion then indicates the mark portion at each gear shift position. In this manner, the gear shift position is notified. In this case, a rider sees the indicator and the mark portion and accordingly can check that the operation of shifting to the gear shift position has been performed.

Moreover, the gear shift position notification configuration includes not only the mechanical configuration but also an electrical configuration. According to the electrical configuration, for example, an electrical contact being the notification position portion is provided instead of the engagement hole 13a (13b) of the first member 11. Then, the second member 11 as a switching operating member being the notification operating portion may be able to notify each gear shift position by electrical notification. In the electrical gear shift position notification configuration, a gear shift position signal of each gear shift position detected by an electrical contact in a contact or contactless system is outputted to a display unit. Consequently, the rider can visually check the gear shift position (a buzzer sound may also be involved). The display unit can be placed at any position on the bicycle. Hence, the display unit can be placed wherever the rider likes.

Moreover, in the above embodiment and the modification thereof, the spiral spring 21 is used as the pressure unit 20. However, in the present invention, the pressure unit 20 is not limited to the spiral spring 21. The pressure unit 20 may be, for example, a torsion spring.

Moreover, in the above embodiment and the modification thereof, the reverse input shutoff unit 30 is not limited by the configuration illustrated in FIG. 8. For example, the reverse input shutoff unit 30 may be a worm drive including a worm and a worm wheel. In this configuration, the worm is driven on the input shaft portion 1A. A rotary shaft of the worm wheel meshing with the worm is then coupled to the output shaft portion 1B. The reverse input shutoff unit 30 including the worm drive can shut off not only a reverse input in the shift-down direction SD but also a reverse input in the shift-up direction SU.

Moreover, in the above embodiment and the modification thereof, the gear shift operating lever unit 40 performs the shift-down operation with the first operating lever 41, and the shift-up operation with the second operating lever 42. However, the shift-down operation and the shift-up operation may be performed with one operating lever.

LIST OF REFERENCE NUMERALS

100 Gear shift operating apparatus
1 Operating shaft
1A Input shaft portion
1B Output shaft portion
10 Gear shift position notification unit
11, 17 First member
11a Hole portion
12 Second member
12a Engagement protrusion
11A First group
11B Second group
13a, 13b Engagement hole
14a First click ball
14b Second click ball
15a, 15b Ball hole portion 16a, 16b Click spring
20 Pressure unit
21 Spiral spring
21a Inner end
21b Outer end
22 Worm
23 Worm wheel
24 Housing
24a Flange
30, 130 Reverse input shutoff unit
31 Output protrusion
31a Distal end surface
32 Input engagement piece
33 Tube portion
34 Helical torsion spring
34a Spring end
35 Fixed member
35a Notch engagement portion
35b Gap
36 Rolling engagement body
40 Gear shift operating lever unit
41 First operating lever
41A Lever body unit
41B Engagement pawl portion
42 Second operating lever
43 First one-way clutch mechanism
44 Second one-way clutch mechanism
45a First ratchet gear
46a First link plate
47a First support shaft
48a First ratchet pawl
49a First link plate spring
50a First lever spring
45b Second ratchet gear
46b Second link plate
47b Second support shaft
48b Second ratchet pawl
49b Second link plate spring
50b Second lever spring
51 Hinge member
51a Hinge shaft
60 Shift cable
61 One end
62 The other end
63 Retaining member
70 Rear derailleur
71 Axle shaft
72 (72a, 72b, 72c, 72d, 72e) Transmission gear
73 Pulley
74 Link mechanism
75 Tension spring
80 Bicycle handlebar
81 Attachment fitting
82 Brake lever
82a Support shaft
83 Brake cable
84 Brake outer
90 Grip body unit
90a Rubber cover
91 First chamber
91a Mounting portion
91b Screw
92 Second chamber
92a Worm chamber
92b Opening
93 Third chamber
94 Fourth chamber
95 Ball bearing
131 Fixed housing
132 Bushing member
133a One end
133b The other end
134, 135 End portion
136, 138 Flange portion
137 Notch portion
139 Engagement protrusion
137a One end side surface
137b The other end side surface

The invention claimed is:

1. A bicycle gear shift operating apparatus coupled to a transmission of a bicycle via a shift cable, the bicycle gear shift operating apparatus comprising:
   a gear shift operating lever unit configured to pull and release the shift cable;
   a pressure unit configured to apply a biasing force in a direction that cancels out a reverse input added from the transmission via the shift cable; and
   a reverse input shutoff unit configured to transmit power inputted from the gear shift operating lever unit and shut off transmission of power reversely inputted into the gear shift operating lever unit, wherein the reverse input shutoff unit is placed between the gear shift operating lever unit and the pressure unit.

2. A bicycle gear shift operating apparatus coupled to a transmission of a bicycle via a shift cable, the bicycle gear shift operating apparatus comprising:
   a gear shift operating lever unit configured to continuously pull and release the shift cable; and
   a reverse input shutoff unit configured to transmit power inputted from the gear shift operating lever unit and shut off transmission of power reversely inputted into the gear shift operating lever unit; and
   a pressure unit configured to apply a biasing force in a direction that cancels out a reverse input added from the transmission via the shift cable, wherein the reverse input shutoff unit is placed between the gear shift operating lever unit and the pressure unit.

3. The bicycle gear shift operating apparatus according to claim 2, wherein the reverse input shutoff unit includes:
   an input shaft portion having a plurality of input engagement pieces extending outward at regular spacings;
   an output shaft portion having a plurality of output protrusions capable of meshing with the input engagement pieces;
   a tube portion having a cylindrical inner surface and a cylindrical outer surface; and
   a plurality of rolling engagement bodies located between the plurality of input engagement pieces adjacent to each other, and between a respective distal end surface of the plurality of output protrusions and the cylindrical inner surface of the tube portion, each rolling engagement body of the plurality of rolling engagement bodies being locked between the respective distal end surface of a respective output protrusion of the plurality of output protrusions and the cylindrical inner surface of the tube portion to prevent the reverse input acting on the output shaft portion from being transmitted to the input shaft portion.

4. A gear shift position notification apparatus applied to a bicycle gear shift operating apparatus including a gear shift operating lever unit coupled to a transmission of a bicycle via a shift cable and configured to pull and release the shift cable and a reverse input shutoff unit configured to transmit power inputted from the gear shift operating lever unit and shut off transmission of power reversely inputted into the gear shift operating lever unit, the gear shift position notification apparatus comprising:
- a first member and a second member adjacent the first member, the second member configured to rotate with respect to the first member in accordance with operation of the gear shift operating lever unit, wherein:
- the first member includes a plurality of mark portions at a plurality of respective rotation angle positions corresponding to a plurality of gear shift positions of the transmission,
- the second member includes an indicator that indicates a respective mark portion of the plurality of mark portions at a respective gear shift position of the plurality of gear shift positions of the transmission, and
- one or both of the first member and the second member are replaceable.

5. A bicycle gear shift operating apparatus coupled to a transmission of a bicycle via a shift cable, the bicycle gear shift operating apparatus comprising:
- a gear shift operating lever unit configured to pull and release the shift cable; and
- a reverse input shutoff unit configured to transmit power inputted from the gear shift operating lever unit and shut off transmission of power reversely inputted into the gear shift operating lever unit, wherein:
- the reverse input shutoff unit includes:
  - an input shaft portion having a plurality of input engagement pieces extending outwardly at regular spacings;
  - an output shaft portion having a plurality of output protrusions capable of meshing with the plurality of input engagement pieces;
  - a tube portion having a cylindrical inner surface and a cylindrical outer surface; and
  - a plurality of rolling engagement bodies located between the plurality of input engagement pieces adjacent to each other, and between a respective distal end surface of the plurality of output protrusions and the cylindrical inner surface of the tube portion, each rolling engagement body of the plurality of rolling engagement bodies being locked between the respective distal end surface of a respective output protrusion of the plurality of output protrusions and the cylindrical inner surface of the tube portion to prevent a reverse input acting on the output shaft portion from being transmitted to the input shaft portion.

6. The bicycle gear shift operating apparatus according to claim 5 comprising:
- a pressure unit configured to apply a biasing force in a direction that cancels out the reverse input added from the transmission via the shift cable, wherein the reverse input shutoff unit is placed between the gear shift operating lever unit and the pressure unit.

7. A bicycle gear shift operating apparatus coupled to a transmission of a bicycle via a shift cable, the bicycle gear shift operating apparatus comprising:
- a gear shift operating lever unit configured to pull and release the shift cable;
- a replaceable gear shift position notification unit wherein a plurality of stop positions correspond respectively to a plurality of gear shift positions of the transmission, the plurality of gear shift positions being switched in accordance with operation of the gear shift operating lever unit, are set; and
- a reverse input shutoff unit configured to transmit power inputted from the gear shift operating lever unit and shut off transmission of power reversely inputted into the gear shift operating lever unit, wherein:
- the gear shift position notification unit includes a first member and a second member that rotate relatively in accordance with operation of the gear shift operating lever unit,
- the first member includes a plurality of mark portions at a plurality of rotation angle positions corresponding to the plurality of gear shift positions of the transmission,
- the second member includes an indicator that indicates a respective mark portion of the plurality of mark portions at a respective gear shift position of the plurality of gear shift positions of the transmission, and
- one or both of the first member and the second member are replaceable.

8. The bicycle gear shift operating apparatus according to claim 7, comprising a pressure unit configured to apply a biasing force in a direction that cancels out a reverse input added from the transmission via the shift cable.

9. The bicycle gear shift operating apparatus according to claim 8, wherein the reverse input shutoff unit is placed between the gear shift operating lever unit and the pressure unit.

* * * * *